United States Patent
Fukasawa et al.

(10) Patent No.: US 10,252,933 B2
(45) Date of Patent: Apr. 9, 2019

(54) SILICA GLASS MEMBER AND METHOD OF MANUFACTURING THE SAME

(71) Applicant: CoorsTek KK, Tokyo (JP)

(72) Inventors: Yuji Fukasawa, Hadano (JP); Sachiko Kato, Hadano (JP)

(73) Assignee: COORSTEK KK, Shinagawa-Ku, Tokyo (JP)

( * ) Notice: Subject to any disclaimer, the term of this patent is extended or adjusted under 35 U.S.C. 154(b) by 0 days.

(21) Appl. No.: 15/608,118

(22) Filed: May 30, 2017

(65) Prior Publication Data

US 2017/0349477 A1 Dec. 7, 2017

(30) Foreign Application Priority Data

Jun. 3, 2016 (JP) ................................ 2016-111495
Mar. 1, 2017 (JP) ................................ 2017-038516

(51) Int. Cl.
*C03C 3/06* (2006.01)
*C03B 25/02* (2006.01)
(Continued)

(52) U.S. Cl.
CPC ............ *C03C 3/06* (2013.01); *C03B 19/1461* (2013.01); *C03B 25/02* (2013.01); *C03B 27/02* (2013.01);
(Continued)

(58) Field of Classification Search
CPC .......................... C03C 2201/12; C03C 2201/14
See application file for complete search history.

(56) References Cited

U.S. PATENT DOCUMENTS 6,242,136 B1 * 6/2001 Moore ................ C03B 19/1453
430/5
2006/0081008 A1 4/2006 Hirata et al.
(Continued)

FOREIGN PATENT DOCUMENTS

JP 2001-180963 A 7/2001
JP 3228676 B2 11/2001
(Continued)

OTHER PUBLICATIONS

Office Action issued by the Taiwan Patent Office dated Oct. 19, 2017 in corresponding Taiwanese Patent Application No. 106111713 (4 pages).
(Continued)

*Primary Examiner* — Noah S Wiese
(74) *Attorney, Agent, or Firm* — Buchanan, Ingersoll & Rooney PC

(57) ABSTRACT

Provided is a silica glass member which exhibits high optical transparency to vacuum ultraviolet light and has a low thermal expansion coefficient of $4.0 \times 10^{-7}$/K or less at near room temperature, particularly a silica glass member which is suitable as a photomask substrate to be used in a double patterning exposure process using an ArF excimer laser (193 nm) as a light source. The silica glass member is used in a photolithography process using a vacuum ultraviolet light source, in which the fluorine concentration is 1 wt % or more and 5 wt % or less, and the thermal expansion coefficient at from 20° C. to 50° C. is $4.0 \times 10^{-7}$/K or less.

13 Claims, 1 Drawing Sheet

(51) Int. Cl.
*C03B 27/02* (2006.01)
*C03C 4/00* (2006.01)
*C03B 19/14* (2006.01)
*C03B 27/04* (2006.01)
*C03B 32/00* (2006.01)

(52) U.S. Cl.
CPC ............ *C03B 27/028* (2013.01); *C03B 27/04* (2013.01); *C03B 32/00* (2013.01); *C03C 4/0085* (2013.01); *C03B 2201/07* (2013.01); *C03B 2201/075* (2013.01); *C03B 2201/12* (2013.01)

(56) References Cited

U.S. PATENT DOCUMENTS

2009/0163344 A1* 6/2009 Weber .................. C03B 19/06
 501/53
2011/0244154 A1* 10/2011 Krause ............. C03B 37/01446
 428/34.6

FOREIGN PATENT DOCUMENTS

| JP | 2002-316831 A | 10/2002 |
|----|---------------|---------|
| JP | 2006-225249 A | 8/2006 |
| TW | 200909374 A | 3/2009 |

OTHER PUBLICATIONS

Schultz et al., "Ultra-Low-Expansion Glasses and Their Structure in the $SiO_2$—$TiO_2$ System", *Amorphous Materials : Papers presented to the Third International Conference on the Physics of Non-crystalline Solids held at Sheffield University*, Sep. 1970, 1972, pp. 453-461, Wiley-Interscience, London; New York, N.Y.

Carson et al., "Optical Attenuation in Titania-Silica Glasses", *Journal of Non-Crystalline Solids*, Jan. 1973, pp. 368-380, vol. 11, Issue 4, North-Holland Publishing Co., The Netherlands.

Murata, "Development of Optical Fibers in Japan", *Japanese Technology Reviews*, Jan. 1, 1989, pp. 4-11, 24-89, 124-125, vol. 11, Gordon and Breach Science Publishers, New York.

Sugimoto, "Photonics Glasses", *Res. Reports Asahi Glass Co., Ltd.*, 2007, pp. 75-81, vol. 57, Japan, UDC: 666.225.

Brückner, "Properties and Structure of Vitreous Silica. I", *Journal of Non-Crystalline Solids*, Nov. 1970, pp. 123-175, vol. 5, Issue 2, North-Holland Publishing Co., The Netherlands.

\* cited by examiner

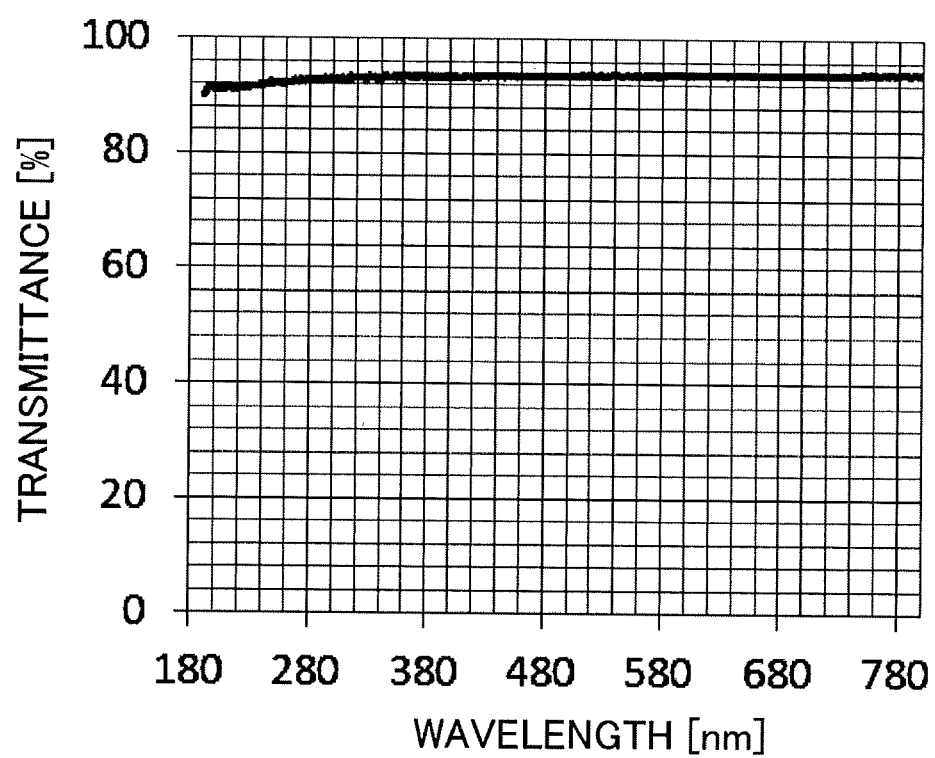

SILICA GLASS MEMBER AND METHOD OF MANUFACTURING THE SAME

BACKGROUND OF THE INVENTION

Technical Field

The present invention relates to a silica glass member and a method of manufacturing the same. More specifically, it relates to a silica glass member for photomask which can be suitably used in photolithography in a vacuum ultraviolet wavelength region.

Description of the Related Art

In recent years, in the lithography technology, a demand for fine patterning in semiconductor devices has increased more and more, and a method has been employed in which the numerical aperture of a lens to be used for exposure is increased by shortening of the exposure wavelength or an immersion lithography technique to immerse pure water or the like between the lens and the wafer.

The resolution R in photolithography can be expressed by the expression $R=k1\lambda/NA$, where $\lambda$ denotes the wavelength of exposure light, NA denotes the numerical aperture representing the lens performance of the exposure apparatus, and k1 denotes the process constant, and the resolution can be improved by shortening the exposure wavelength $\lambda$, increasing the numerical aperture NA, and decreasing the process constant k1.

Here, with regard to the exposure wavelength $\lambda$, g-rays (436 nm) of a mercury lamp was first used and i-rays (365 nm), a KrF excimer laser (248 nm), and an ArF excimer laser (193 nm) have been so far used, and the wavelength of the light source has been shortened.

The numerical aperture NA geometrically represents the size of the lens, and it is expressed by the expression $NA=n \cdot \sin \theta$, (where n denotes the refractive index of the medium between the lens and the wafer and $\theta$ denotes the angular aperture of ray of light) in a case in which the exposure light is focused by the lens and an image is formed on the wafer surface.

Here, when an ArF excimer laser having a wavelength of exposure light of 193 nm is used and the immersion lithography technique is used, a resolution of 43 nm can be achieved in a case in which the numerical aperture is set to 1.35 and the process constant k1 (k1 factor) is 0.3.

Moreover, a silica glass substrate is suitably used as a substrate for photolithography using this ArF excimer laser since it exhibits low thermal expansion property and excellent optical transparency.

Examples of the performance required of the silica glass substrate may include light resistance that the silica glass substrate does not deteriorate optical transparency even when being exposed to high energy light in the case of using an ArF excimer laser. In addition, in the case of conducting immersion lithography, the angular aperture of ray of light increases since the difference between the refractive index of pure water present between the lens and the wafer and the refractive index of the resist decreases, and a problem is thus caused in the effect of polarization. Hence, the silica glass substrate is required to exhibit low birefringence. This is because there is a case in which the transmitted exposure light undergoes polarization change and the imaging performance deteriorates when the silica glass substrate exhibits birefringence.

For example, JP 2001-180963 A discloses a method in which a porous silica glass body (soot) is fabricated by flame hydrolysis of a silica glass forming raw material, a silica glass ingot is then fabricated by the VAD method by which the porous silica glass body (soot) is transparentized and further subjected to a heat treatment in a hydrogen atmosphere to be doped with an OH group and hydrogen, thereby improving the light resistance to an ArF excimer laser and the like as a method of manufacturing silica glass satisfying these requirements.

In addition, JP 2002-316831 A discloses a method of manufacturing fluorine-doped silica glass in which a porous silica glass body (soot) is fabricated by flame hydrolysis of a glass raw material for forming silica glass and then subjected to dehydration, fluorine doping, and a transparentizing treatment, thereby improving the transmittance and laser resistance of the fluorine-doped silica glass to vacuum ultraviolet light having strong energy such as an $F_2$ excimer laser. In the fluorine-doped silica glass described in JP 2002-316831 A, it is considered that the thermal expansion at near room temperature is decreased by about 10% as compared to the case of only quartz glass by fluorine doping.

In addition, JP 3228676 B discloses a method in which the porous silica glass body (soot) is subjected to zone melting at a degree of vacuum of 100 Pa or less to be formed into transparent glass and then subjected to treatment to determine the fictive temperature in an atmosphere of an oxygen-containing gas or a hydrogen-containing gas, thereby retaining an excellent transmittance at a wavelength of 165 nm even after far ultraviolet irradiation.

Meanwhile, as a means for modifying silica glass, for example, JP 2006-225249 A discloses a method in which relaxation of the glass structure is promoted and birefringence is decreased by subjecting the silica glass to an annealing treatment under specific conditions as an additional treatment after manufacture, and hydrogen doping is conducted by changing a part of the annealing treatment step to a hydrogen atmosphere, thereby improving the light resistance.

It is required to use a double patterning method in order to achieve a resolution of 43 nm or less by an exposure method using an ArF excimer laser. Double patterning is a method in which exposure is conducted by being divided into two times, and it is also possible to achieve a resolution of 32 nm or less, which is a finer device pattern by using this method.

In the case of conducting fine patterning of the device by using double patterning, a significantly high overlay accuracy of patterns is required between the two times of lithography since aberration of patterns occurs when the position of the target pattern is not accurately exposed.

Hence, the silica glass substrate for photomask is required to exhibit lower thermal expansion as compared to conventional silica glass in order to avoid position aberration due to thermal expansion at the time of exposure. Here, the overlay accuracy of double patterning exposure refers to the sum of the overlay accuracy for the two times of exposures, and the overlay accuracy required for each exposure is said to be about from 3 to 4 nm. Meanwhile, the thermal expansion coefficient of ordinary silica glass is from $5.0 \times 10^{-7}$/K to $6.0 \times 10^{-7}$/K and the elongation of a 1 cm quartz piece is from 5 to 6 nm per 1 K of temperature rise, and it is thus hard to say that it is sufficient as the required accuracy. Hence, the silica glass substrate for photomask is required to exhibit lower thermal expansion than ordinary silica glass.

In addition, as a silica glass substrate for light transmission type photomask, the optical transparency at 193 nm of the exposure wavelength of the ArF excimer laser is required to be equivalent to that of the conventional silica glass.

As silica glass characterized by low thermal expansion property, ULE glass (Corning Code 7972) manufactured by Corning Incorporated and the like are already known ("Amorphous Materials", Paper presented to the Third International Conference on the Physics of Non-Crystalline Solids held at Sheffield University, September 1970). In the "Amorphous Materials", it is reported that thermal expansion is decreased by doping silica glass with $TiO_2$, and a significantly low thermal expansion coefficient of $0.1\times10^{-7}$/K or less is exerted by adjusting the concentration of $TiO_2$. However, in the $TiO_2$—$SiO_2$-based glass, the optical transparency at 193 nm is significantly poor since the absorption edge of the ultraviolet wavelength is present at from 300 nm to 400 nm, and it is thus impossible to achieve both low thermal expansion property and optical transparency (Journal of Non-Crystalline Solids, Vol. 11 (1973) p. 368). This is because absorption in the visible light region occurs by the so-called d-d transition between energy gaps in the d electronic structure of Ti by doping $TiO_2$. In addition, it is known that the absorption in the visible light region by a Ti ion is affected by the adjacent oxygen atom, and it is known that the absorption wavelength varies depending on the ionic valence of $Ti^{3+}$ and $Ti^{4+}$, but the absorption band is formed between 300 nm and 400 nm in any case. Hence, development of a silica glass substrate by a method other than the $TiO_2$—$SiO_2$-based glass is required.

SUMMARY OF THE INVENTION

An object of the present invention is to provide a silica glass member which exhibits high optical transparency to vacuum ultraviolet light and exhibits lower thermal expansion property as compared to conventional silica glass and a method of manufacturing the same.

A silica glass member according to the present invention is silica glass to be used in a photolithography process using vacuum ultraviolet light as a light source, wherein a fluorine concentration is 1 wt % or more and 5 wt % or less, and a thermal expansion coefficient at from 20° C. to 50° C. is $4.0\times10^{-7}$/K or less.

The silica glass member of the present invention exhibits high optical transparency to an ArF excimer laser (193 nm) and exhibits lower thermal expansion property as compared to conventional silica glass as it has the above-described configuration.

It is preferable that a density of the silica glass member is 2.16 g/cm³ or more and 2.19 g/cm³ or less.

It is preferable that a concentration of an OH group in the silica glass member is 10 ppm or less.

It is preferable that a fictive temperature of the silica glass member is 1000° C. or lower.

It is preferable that concentrations of Fe, Cr, Ni, Cu, and Ti in the silica glass member are each 1 wt ppm or less, and a viscosity coefficient at a temperature of 1000° C. is $10^{14.5}$ dPa·s or less.

It is preferable that, in the silica glass member, a linear transmittance of light having a wavelength of 193 nm is preferably 90% or more.

The method of manufacturing a silica glass member of the present invention includes preparing silica glass having a fluorine concentration of 1 wt % or more and 5 wt % or less, heating the silica glass in a heating furnace to a temperature ranging from a temperature which is 1000° C. or higher and has a viscosity coefficient of $10^{14.5}$ dPa·s or less to 1500°, taking out the silica glass from the heating furnace, and subjecting the silica glass to a quenching (rapidly cooling) treatment and to an annealing treatment again in a temperature range of from 400° C. to a temperature which is 1000° C. or lower and has a viscosity coefficient of the silica glass of $10^{14.5}$ dPa·s or less.

According to the present invention, it is possible to provide a fluorine-doped silica glass member which exhibits high optical transparency to the ArF excimer laser (193 nm) and exhibits lower thermal expansion property as compared to conventional silica glass and a method of manufacturing the same.

The silica glass member of the present invention can achieve a low thermal expansion coefficient of $4.0\times10^{-7}$/K or less at near room temperature, by, for example, subjecting a porous silica body (soot) to fluorine doping, a transparentizing treatment, then a quenching treatment from a temperature of 1000° C. or higher, and further an annealing treatment in a temperature range of 1000° C. or lower.

Such a silica glass member is suitable as a photomask substrate to be used in a double patterning exposure process using an ArF excimer laser as a light source.

BRIEF DESCRIPTION OF THE DRAWINGS

FIG. 1 illustrates the transmittance curve of Example 1.

DESCRIPTION OF THE EMBODIMENTS

The silica glass member of the present invention is silica glass to be used in a photolithography process using vacuum ultraviolet light as a light source, in which the fluorine concentration is 1 wt % or more and 5 wt % or less, and the thermal expansion coefficient at from 20° C. to 50° C. is $4.0\times10^{-7}$/K or less.

The above constitutional requirements of the present invention will be described in detail below.

In the present invention, the fluorine concentration in the silica glass member is 1 wt % or more and 5 wt % or less. It was widely known that fluorine-doped silica glass exhibits low thermal expansion property at 300° C. or higher when fluorine-doped optical fibers were studied in the past, and it is also reported that the thermal expansion coefficient thereof is $2.5\times10^{-7}$/K at near 400° C. (Development of optical fibers in Japan, New York: Gordon and Breach Science Publishers, c 1989.). However, fluorine doping does not almost affect the thermal expansion coefficient at a temperature between 20° C. and 50° C. including room temperature even in such a fluorine-doped silica glass. For example, even in the silica glass doped with fluorine up to 1.5 wt %, the thermal expansion coefficient at from 5° C. to 65° C. is not almost different from that of silica glass that is not doped (Res. Reports Asahi Glass Co., Ltd., 57 (2007)).

As the principle, the fluorine doping replaces the OH group which is the terminal structure of the silica glass and cuts a part of the member ring structure (for example, a three-membered ring structure, a four-membered ring structure, or a six-membered ring structure) to form a new terminal group structure, and it is thus possible to dope fluorine to be 10-fold or more than other terminal groups (for example, an OH group and a Cl group) contained in the silica glass in a weight ratio depending on the doping conditions. Moreover, silica glass having a large number of terminal group structures has a feature to exhibit low viscosity.

To exhibit low viscosity means that the density of silica glass is low and the structural change occurs at a relatively low temperature. Moreover, this also means that the flowability of the molecules in the silica glass is great and the structural change is remarkable at a high temperature. In other words, the silica glass having a large number of terminal group structures has a wide temperature range in which the structure thereof changes. In this manner, in silica glass having a large number of fluorine groups, it is easy to set the fictive temperature in a wide temperature range and it is possible to control the density by combining the quenching treatment and the annealing treatment.

In the present invention, a silica glass member having a fluorine concentration of 1 wt % or more and 5 wt % or less, a decreased density, and a thermal expansion coefficient of $4.0 \times 10^{-7}$/K or less at from 20° C. to 50° C. is obtained by subjecting silica glass to fluorine doping and a predetermined heat treatment.

Specifically, the silica glass member can be manufactured by, for example, the so-called VAD method in which a porous silica body (soot) is formed by flame hydrolysis of a silica glass forming raw material and then subjected to a transparentizing treatment (JP 2001-342027 A). In other words, the soot is formed, then doped with fluorine by being treated in a mixed gas atmosphere in which an inert gas such as helium and $SiF_4$ gas are mixed, then transparentized in a fluorine-containing atmosphere (mixed gas atmosphere), and further subjected to a predetermined heat treatment, whereby a silica glass member is manufactured.

The fluorine concentration (concentration proportion of $SiF_4$ gas) in the mixed gas is preferably from more than 5 vol % to 35 vol %, more preferably from 10 vol % to 35 vol %, and particularly preferably from 25 vol % to 35 vol %. In addition, the introduction temperature of the mixed gas is preferably from 1000° C. to 1300° C. and more preferably from 1100° C. to 1200° C. There is a case in which diffusion of fluorine into the glass structure is slow and fluorine is not sufficiently doped when the introduction temperature is lower than 1000° C. On the other hand, sintering of soot starts and diffusion of fluorine into the glass structure is hindered when the temperature exceeds 1300° C.

In the present invention, the concentration of fluorine in the obtained silica glass member is set to 1 wt % or more and 5 wt % or less by, for example, adjusting the concentration proportion of $SiF_4$ gas in the mixed gas and the calcination temperature in the transparentizing treatment.

The predetermined heat treatment in the present invention refers to a process of subjecting the fluorine-doped silica glass at 1000° C. or higher to a quenching treatment after a transparentizing treatment and to an annealing treatment at 1000° C. or lower thereafter. Incidentally, the quenching treatment may be continuously conducted without once lowering the temperature after the transparentizing treatment.

The quenching treatment in the present invention refers to a treatment that the silica glass is heated in a temperature range of from 1000° C. to 1500° C. until the viscosity coefficient reaches $10^{14.5}$ dPa·s or less and preferably $10^{13.0}$ dPa·s or less and thereafter, the silica glass is rapidly cooled to 800° C. or lower, and it is more preferable as the temperature after rapid cooling is lower so that 600° C. is more preferable than 800° C. and 400° C. is more preferable than 600° C. In addition, with regard to the cooling rate, it is required to be rapid cooling to decrease 1000 K in about 1 second. Examples of rapid cooling may include to directly transfer the silica glass from the heating furnace to a low-temperature gas or liquid refrigerant that is present to be adjacent thereto. For example, a treatment may be conducted in which silica glass is heated to 1500° C. and then released into the atmospheric air, and the air is blown to the silica glass or the silica glass is dipped into the pool of pure water. It is possible to rapidly decrease the temperature of the silica glass to the refrigerant temperature as the air flow velocity after release into the atmospheric air is set to a value sufficient for cooling or the volume of the pure water pool is prepared in a sufficient amount with respect to the target silica glass by calculating the volume from the heat capacity at this time.

Incidentally, it is required to cool the silica glass as instantaneously as possible in the quenching treatment, it is thus preferable that the quenching treatment is conducted by forming the silica glass in a thin plate shape rather than a block shape, and also it is more preferable to conduct the quenching treatment in a liquid such as water or oil although it may be conducted in the air. In particular, it is preferable that large silica glass is thinned in order to uniformly rapidly cool the entire silica glass. In the present invention, the viscosity of the silica glass is determined mainly by the amount of fluorine and the temperature, but the properties of the silica glass before cooling are fixed and the thermal expansion coefficient at normal temperature can be decreased by rapidly cooling the silica glass after the silica glass is heated until the viscosity sufficiently decreases. Specifically, the object of the present invention that is a low thermal expansion coefficient can be achieved by rapidly cooling the silica glass from a temperature higher than a temperature at which the viscosity coefficient of the silica glass is $10^{14.5}$ dPa·s by 200° C. or more to a temperature lower than the temperature by 100° C. or more while sandwiching the temperature therebetween.

The silica glass exhibits low viscosity when being doped with fluorine so that the molecular vibration in the glass is vigorous at 1000° C. or higher and it is presumed that the volume expansion is microscopically caused. By conducting the quenching treatment in this state, the glass structure is frozen while maintaining the volume expanded state, and the silica glass thus has a decreased density.

However, there is a case in which local strain due to the small member ring structure typified by a three-membered ring or a four-membered ring may remain in the structure by the quenching treatment, and in that case, an annealing treatment for removing the strain is required after the quenching treatment. It is required to conduct the annealing treatment at 1000° C. or lower and a viscosity coefficient in a range of $10^{14.5}$ dPa·s or less. The annealing temperature is determined by the temperature characteristic of the silica glass. For example, the strain point of silica glass having a fluorine concentration of 1 wt % or more and 5 wt % or less is 1000° C. or lower, and thus the annealing temperature is usually 1000° C. or lower, preferably 800° C. or lower, and more preferably between 600° C. and 400° C. It is possible to eliminate the local strain of the silica glass while maintaining the low density state by conducting an annealing treatment that the silica glass after cooling is heated by a heater or the like and, for example, retained at a temperature of 400° C. for about 50 hours after being rapidly cooled in the quenching treatment. The effect of an annealing treatment cannot be expected at a temperature lower than 400° C.

Incidentally, the strain point is a temperature at which the viscosity coefficient is $10^{14.5}$ dPa·s and a temperature at which viscous flow of silica glass cannot practically occur, and it corresponds to the lower limit temperature in the annealing range. Accordingly, the viscosity coefficient of the silica glass member of the present invention at 1000° C. is preferably $10^{14.5}$ dPa·s or less and more preferably $10^{13.0}$ dPa·s or less.

The thermal expansion coefficient of the silica glass member thus obtained at from 20° C. to 50° C. is $4.0 \times 10^{-7}$/K or less, preferably $3.2 \times 10^{-7}$/K or less, and more preferably 3.0×10$^{-7}$/K or less. In addition, the density of the silica glass member at from 20° C. to 50° C. is 2.16 g/cm$^3$ or more and 2.19 g/cm$^3$ or less, specifically, 2.190 g/cm$^3$ or less, preferably 2.185 g/cm$^3$ or less, and more preferably 2.16 g/cm$^3$ or more and 2.180 g/cm$^3$ or less. When the density is less than 2.16 g/cm$^3$, the hardness of the surface of the silica glass member tends to be insufficient, breakage occurs in the polishing step and the transportation step, and thus the silica glass member cannot be used in the photolithography process in some cases. Incidentally, the density of the silica glass member is related to the fluorine concentration as well, and thus the fluorine concentration is 1 wt % or more and 5 wt % or less, preferably 1.5 wt % or more and 5 wt % or less, and more preferably 3 wt % or more and 5 wt % or less.

It is known that the thermal expansion of silica glass varies depending on the fictive temperature (Journal of Non-Crystalline Solids vol. 5 (1970) p. 123). The fictive temperature corresponds to a temperature at which freezing of glass in which a structure in a supercooled liquid state at a high temperature is frozen occurs. It is known that the thermal expansion of silica glass varies depending on the density as well, and it is reported that the thermal expansion coefficient of densified glass increases ("Materials", Vol. 32, No. 362, p. 64). In other words, the structure of silica glass varies depending on the density and freezing temperature, and, for example, in the case of densified glass, volume expansion is remarkable since the gap called the free volume between the glass network structures is small and the gaps to alleviate molecular vibration accompanying temperature rise are few.

It is known that the fictive temperature of silica glass can be changed by an annealing treatment. The fictive temperature also depends on the concentration of the OH group in the silica glass, and the fictive temperature is likely to decrease as the concentration of the OH group increases. This is because the OH group is present at the terminal portion in the glass structure, the member ring structure is cut by the annealing treatment, the flowability of the glass structure increases, and the structure freezing temperature thus decreases. However, there is limitation on a decrease in density by a change in fictive temperature of the silica glass, and it is reported that the thermal expansion coefficient of the silica glass in which the fictive temperature and the concentration of the OH group are changed is approximately from 6.0×10$^{-7}$/K to 6.5×10$^{-7}$/K between 20° C. and 400° C. (Journal of Non-Crystalline Solids, vol. 355 (2009) p. 323).

Meanwhile, it is conventionally known that the member ring structure is cut and the glass structure changes when silica glass is doped with fluorine, and, for example, it is reported that the bond angle of —Si—O—Si— in the member ring structure changes (Journal of the Ceramic Society of Japan vol. 120 (2012) p. 447). In other words, it is possible to change the fictive temperature and to decrease the density of silica glass by doping the silica glass with fluorine.

In the present invention, it is possible to control the fictive temperature of glass having a fluorine group by combining the quenching treatment and the annealing treatment, but the fictive temperature is preferably 1000° C. or lower and more preferably 900° C. or lower in order to set the thermal expansion coefficient at from 20° C. to 50° C. to 4.0×10$^{-7}$/K or less. The silica glass is often in a state in which the local strain is not eliminated in a case in which the fictive temperature exceeds 1000° C., and in that case, a stable low thermal expansion property cannot be exerted in some cases. Incidentally, the fictive temperature can be determined on the basis of the calculation formula reported in Journal of Non-Crystalline Solids vol. 185 (1995) p. 191. It is reported that the fictive temperature correlates with the infrared absorption wavenumber of asymmetric stretching vibration of Si—O—Si of silica glass, but it is expected that the frequency changes as fluorine is doped in the glass structure. The fictive temperature of fluorine-doped glass can be calculated when glass having a known fluorine concentration is thermally treated at a predetermined temperature in advance, the temperature is regarded as a fictive temperature, and the difference between the fictive temperature and the value calculated by the basic formula is used as a correction coefficient. As these calculation formulas, several calculation formulas are reported, and in the present invention, the formula that is reported in JP 2002-316831 A and used in a case in which the fluorine concentration is 1 wt % or more is employed.

In the silica glass member of the present invention, the concentration of an OH group is preferably 10 ppm or less. There is a case in which it is difficult to set the fluorine concentration to 1 wt % or more in a case in which the concentration of an OH group exceeds 10 ppm. This is due to the trade-off relationship that fluorine concentration is low when the concentration of an OH group is high since fluorine is exchanged with the OH group.

The concentrations of Fe, Cr, Ni, Cu, and Ti contained in the silica glass member thus obtained are each 1 wt ppm or less, and the viscosity coefficient at a temperature of 1000° C. is preferably 10$^{14.5}$ dPa·s or less.

In order to use a silica glass member in a photolithography process using an ArF excimer laser light source, optical transparency at an exposure wavelength of 193 nm is required. At this time, metal impurities in the glass cause deterioration in transparency. In particular, the metal impurities typified by transition metals such as Fe, Cr, Ni, Cu, and Ti cause the d-d transition between the d orbitals that are the excited level of electrons, have an absorption edge in the visible region, and thus remarkably deteriorate transparency in the ultraviolet region. Hence, the concentrations of these metal impurities are each preferably 1 wt ppm or less in the silica glass member as described above.

The silica glass member can be used in photolithography using vacuum ultraviolet light as a light source. Here, the vacuum ultraviolet light refers to an electromagnetic wave having a wavelength in the vicinity of from 10 nm to 200 nm, and the vacuum ultraviolet laser includes an ArF excimer laser (193 nm), an F$_2$ laser (157 nm), and the like.

In the silica glass member, the optical transparency of the ArF excimer laser at an exposure wavelength of 193 nm is 85% or more, preferably 90% or more, and more preferably 91% or more as a linear transmittance, and it is equivalent to or higher than the light transmittance of conventional silica glass.

EXAMPLES

Hereinafter, the present invention will be specifically described based on Examples, but the present invention is not limited by the following Examples.

Example 1

SiCl$_4$ as a glass forming raw material was hydrolyzed in oxyhydrogen flame, the silica fine particles thus produced were deposited on a quartz glass target, thereby obtaining porous silica (soot) having a diameter of 200 mm and a length of 500 mm. Subsequently, the soot was inserted in a furnace the temperature thereof was raised to 1200° C. at a rate of temperature rise of 400° C./h in a He gas atmosphere having a flow rate of 20 L/min, the atmosphere gas was then switched to a mixed gas of $SiF_4$: 20 vol %+He: 80 vol % (flow rate: 15 L/min), and the soot was retained at 1200° for 3 hours, thereby conducting a fluorine doping treatment.

After the fluorine doping treatment was completed, the atmosphere was maintained as it was, and the temperature of the fluorine-doped soot was raised to 1400° C. at a rate of temperature rise of 400° C./h, and the fluorine-doped soot was retained at 1400° for 2 hours to conduct a transparentizing treatment, thereby obtaining a silica glass ingot having a diameter of 120 mm and a length of 230 mm.

The ingot was once returned to normal temperature and was sliced to be formed into a thin plate having a thickness of 6.4 mm, the thin plate was put in an electric furnace, the temperature was raised in the atmospheric air atmosphere, and the thin plate was retained at 1100° C. for 1 hour, then taken out from the furnace, and subjected to a quenching treatment to rapidly cool the thin plate to 20° C. by blowing a large amount of air thereto. After the quenching treatment, the thin plate was further reheated to 1000° C. at a rate of temperature rise of 100° C./h in the atmospheric air atmosphere again and left to be naturally cooled to conduct an annealing treatment, thereby obtaining a silica glass member.

The silica glass member thus obtained was cut, processed into a cylindrical shape, and then subjected to the measurement of thermal expansion by an optical interference type thermal expansion meter (LIX-2 manufactured by ADVANCE RIKO, Inc.). Furthermore, a strip-shaped sample of 20 mm×40 mm×6.4 mm was cut out and subjected to optical polishing, then the measurement of linear transmittance at a wavelength of 193 nm by a vacuum ultraviolet measuring device (JASCO VUV-200), and the measurement of fictive temperature and OH concentration attributed to the OH absorption peak by an infrared spectrometer (Nicolet 6700). The strip-shaped sample was also subjected to the analysis of F concentration by ion chromatography, the measurement of density by the Archimedes method (JIS R 1634), the analysis of metal impurities by a mass spectrometer, and the measurement of viscosity coefficient by a beam bending method (ISO 7884-4).

Example 2

A silica glass member was obtained in the same manner as in Example 1 except that the fluorine doping treatment was conducted by setting the ratio of $SiF_4$ to He in the mixed gas to 30 vol %: 70 vol % in Example 1. Thereafter, the silica glass member was subjected to the same tests and evaluations as in Example 1.

Examples 3 and 4

Silica glass members were obtained in the same manner as in Example 1 except that the fluorine doping treatment was conducted by setting the ratio of $SiF_4$ to He in the mixed gas to 30 vol %: 70 vol % and the annealing treatment was conducted at 800° C. (Example 3) or 600° C. (Example 4) after the quenching treatment of the obtained thin plates at 1300° C. for 1 hour in Example 1. Thereafter, the silica glass members were subjected to the same tests and evaluations as in Example 1.

Example 5

A silica glass member was obtained in the same manner as in Example 1 except that the fluorine doping treatment was conducted by setting the ratio of $SiF_4$ to He in the mixed gas to 8 vol %: 92 vol % in Example 1. Thereafter, the silica glass member was subjected to the same tests and evaluations as in Example 1.

Example 6

A silica glass member was obtained in the same manner as in Example 1 except that the fluorine doping treatment was conducted by setting the ratio of $SiF_4$ to He in the mixed gas to 8 vol %: 92 vol % and the annealing treatment of the thin plate was conducted at 800° C. after the quenching treatment in Example 1. Thereafter, the silica glass member was subjected to the same tests and evaluations as in Example 1.

Example 7

A silica glass member was obtained in the same manner as in Example 1 except that the thin plate was dropped from the furnace to be immersed in water at normal temperature at the time of the quenching treatment in Example 1. Thereafter, the silica glass member was subjected to the same tests and evaluations as in Example 1.

Example 8

The soot fabricated in the same manner as in Example 1 was put into a furnace and the temperature thereof was raised to 1200° C. at a rate of temperature rise of 400° C./h in a He gas atmosphere having a flow rate of 20 L/min, the atmosphere gas was then switched to a mixed gas of $SiF_4$: 25 vol %+He: 75 vol % (flow rate: 15 L/min), and the soot was retained at 1200° for 3 hours to conduct fluorine doping.

After the fluorine doping treatment was completed, the atmosphere was switched to a mixed gas of $SiF_4$: 20 vol %+He: 80 vol %, and the temperature of the fluorine-doped soot was raised to 1400° C. at a rate of temperature rise of 400° C./h, and the fluorine-doped soot was retained at 1400° for 2 hours to conduct a transparentizing treatment, thereby obtaining a silica glass ingot having a diameter of 120 mm and a length of 230 mm.

A thin plate (thickness 6.4 mm) sliced from the silica glass ingot thus obtained was retained at 1300° C. for 1 hour in the atmospheric air atmosphere, and then dropped from the furnace to be immersed in water at normal temperature to conduct a quenching treatment. After the quenching treatment, the silica glass thin plate was further reheated to 600° C. at a rate of temperature rise of 100° C./h in the atmospheric air atmosphere again and left to be naturally cooled to conduct an annealing treatment, thereby obtaining a silica glass member.

Example 9

The soot fabricated in the same manner as in Example 1 was put into a furnace and the temperature thereof was raised to 1200° C. at a rate of temperature rise of 400° C./h in a He gas atmosphere having a flow rate of 20 L/min, the atmosphere gas was then switched to a mixed gas of $SiF_4$: 35 vol %+He: 65 vol % (flow rate: 15 L/min), and the soot was retained at 1200° for 3 hours to dope fluorine.

After the fluorine doping treatment was completed, the atmosphere was switched to a mixed gas of $SiF_4$: 20 vol %+He: 80 vol %, and the temperature of the fluorine-doped soot was raised to 1400° C. at a rate of temperature rise of 400° C./h, and the fluorine-doped soot was retained at 1400° for 2 hours to conduct a transparentizing treatment, thereby obtaining a silica glass ingot having a diameter of 120 mm and a length of 230 mm.

The silica glass ingot thus obtained was gradually cooled and retained for 1 hour when the temperature thereof reached 1300° C., and then dropped from the furnace to be immersed in water at normal temperature to conduct a quenching treatment. After the quenching treatment, the silica glass ingot was further reheated to 400° C. at a rate of temperature rise of 100° C./h in the atmospheric air atmosphere again and left to be naturally cooled to conduct an annealing treatment, thereby obtaining a silica glass member.

Comparative Example 1

A silica glass member was obtained in the same manner as in Example 1 except that the fluorine doping treatment was conducted by setting the ratio of $SiF_4$ to He in the mixed gas to 5 vol %: 95 vol % in Example 1. Thereafter, the silica glass member was subjected to the same tests and evaluations as in Example 1.

Comparative Examples 2 and 3

Silica glass members were obtained in the same manner as in Comparative Example 1 except that the thin plate was retained at 1300° C. for 1 hour, then subjected to a quenching treatment, and the annealing treatment was conducted at 1000° C. (Comparative Example 2) or 800° C. (Comparative Example 3). Thereafter, the silica glass members were subjected to the same tests and evaluations as in Example 1.

Comparative Example 4

A silica glass member was obtained in the same manner as in Example 1 except that the quenching treatment was omitted in Example 1. Thereafter, the silica glass member was subjected to the same tests and evaluations as in Example 1.

Comparative Example 5

A silica glass member was obtained in the same manner as in Example 1 except that the annealing treatment was omitted in Example 1. Thereafter, the silica glass member was subjected to the same tests and evaluations as in Example 1.

Comparative Example 6

A silica glass member was obtained in the same manner as in Example 1 except that the quenching treatment and the annealing treatment were omitted in Example 1. Thereafter, the silica glass member was subjected to the same tests and evaluations as in Example 1.

The results of Examples 1 to 9 and Comparative Examples 1 to 6 are presented in Table 1. In addition, the transmittance curve of Example 1 is illustrated in FIG. 1.

In Examples, the silica glass was described for those obtained by hydrolysis in oxyhydrogen flame, but the silica glass may be those manufactured by other methods. For example, silica glass obtained by addition of fluorine and a sol-gel method or the like may be subjected to a quenching treatment and then a heat treatment.

TABLE 1

| | Thermal expansion coefficient [×10$^{-7}$] (25° C.) | Transmittance at 193 nm [%] | Fictive temperature [° C.] | Concentration of OH group [ppm] | Concentration of F [wt %] | Density | Concentration of metal impurity (maximum content of any of Fe, Cr, Ni, Cu, or Ti) [wt ppm] |
|---|---|---|---|---|---|---|---|
| Example 1 | 3.1 | 90 | 942 | 2 | 2 | 2.18 | 0.1 |
| Example 2 | 2.3 | 91 | 880 | 1 | 3.3 | 2.18 | 0.1 |
| Example 3 | 2.5 | 91 | 880 | 1 | 3.4 | 2.18 | 0.1 |
| Example 4 | 1.9 | 91 | 876 | 1 | 3.8 | 2.18 | 0.1 |
| Example 5 | 3.7 | 90 | 980 | 5 | 1 | 2.19 | 0.1 |
| Example 6 | 3.5 | 90 | 962 | 4 | 1.1 | 2.19 | 0.1 |
| Example 7 | 2.9 | 90 | 940 | 2 | 2 | 2.18 | 0.1 |
| Example 8 | 1.7 | 91 | 870 | 1 | 3.8 | 2.18 | 0.1 |
| Example 9 | 2.5 | 90 | 800 | 1 | 4 | 2.16 | 0.1 |
| Comparative Example 1 | 4.7 | 90 | 1104 | 7 | 0.6 | 2.2 | 0.1 |
| Comparative Example 2 | 4.5 | 90 | 1082 | 6 | 0.7 | 2.2 | 0.1 |
| Comparative Example 3 | 4.2 | 90 | 1046 | 6 | 0.8 | 2.2 | 0.1 |
| Comparative Example 4 | 5 | 90 | 810 | 2 | 2 | 2.2 | 0.1 |
| Comparative Example 5 | 4.8 | 90 | 1100 | 4 | 2 | 2.18 | 0.1 |
| Comparative Example 6 | 5.2 | 91 | 1051 | 2 | 2 | 2.2 | 0.1 |

Industrial Applicability

The silica glass member of the present invention can be suitably used in photolithography using vacuum ultraviolet light such as an ArF excimer laser (193 nm) or a $F_2$ laser (157 nm) as a light source.

What is claimed is:
1. A silica glass member that is used in a photolithography process using a vacuum ultraviolet light source, wherein
a fluorine concentration is 1 wt % or more and 5 wt % or less, concentrations of Fe, Cr, Ni, Cu, and Ti are each 1 wt ppm or less,
a linear transmittance of light having a wavelength of 193 nm is 90% or more in a thickness of 6.4 mm, and
a thermal expansion coefficient at from 20° C. to 50° C. is $3.5\times10^{-7}$/K or less.

2. The silica glass member according to claim 1, wherein a density is 2.16 g/cm$^3$ or more and 2.19 g/cm$^3$ or less.

3. The silica glass member according to claim 1, wherein a concentration of an OH (hydroxyl) group is 10 ppm or less.

4. The silica glass member according to claim 1, wherein a fictive temperature is 1000° C. or lower.

5. The silica glass member according to claim 1, wherein a viscosity coefficient at a temperature of 1000° C. is $10^{14.5}$ dPa·s or less.

6. The silica glass member according to claim 2, wherein a concentration of an OH (hydroxyl) group is 10 ppm or less.

7. The silica glass member according to claim 2, wherein a fictive temperature is 1000° C. or lower.

8. The silica glass member according to claim 2, wherein a viscosity coefficient at a temperature of 1000° C. is $10^{14.5}$ dPa·s or less.

9. The silica glass member according to claim 3, wherein a fictive temperature is 1000° C. or lower.

10. The silica glass member according to claim 3, wherein a viscosity coefficient at a temperature of 1000° C. is $10^{14.5}$ dPa·s or less.

11. The silica glass member according to claim 4, wherein a viscosity coefficient at a temperature of 1000° C. is $10^{14.5}$ dPa·s or less.

12. The silica glass member according to claim 1, wherein a density is 2.16 g/cm$^3$ or more and 2.19 g/cm$^3$ or less,
a concentration of an OH (hydroxyl) group is 10 ppm or less, a fictive temperature is 1000° C. or lower, and a viscosity coefficient at a temperature of 1000° C. is $10^{14.5}$ dPa·s or less.

13. A method of manufacturing low thermal expansion silica glass, the method comprising:
preparing silica glass having a fluorine concentration of 1 wt % or more and 5 wt % or less;
heating the silica glass in a heating furnace in a temperature range of from 1000° C. to 1500° C. until the viscosity coefficient reaches $10^{14.5}$ dPa·s or less;
taking out the silica glass from the heating furnace; and
subjecting the silica glass to a quenching (rapidly cooling) treatment and to an annealing treatment again in a temperature range of 400° C. or higher and a temperature which is 1000° C. or lower and has a viscosity coefficient of the silica glass of $10^{14.5}$ dPa·s or less.

* * * * *